C. N. WAITE.
Apparatus for Testing Lubricating Oils.
No. 226,639. Patented April 20, 1880.
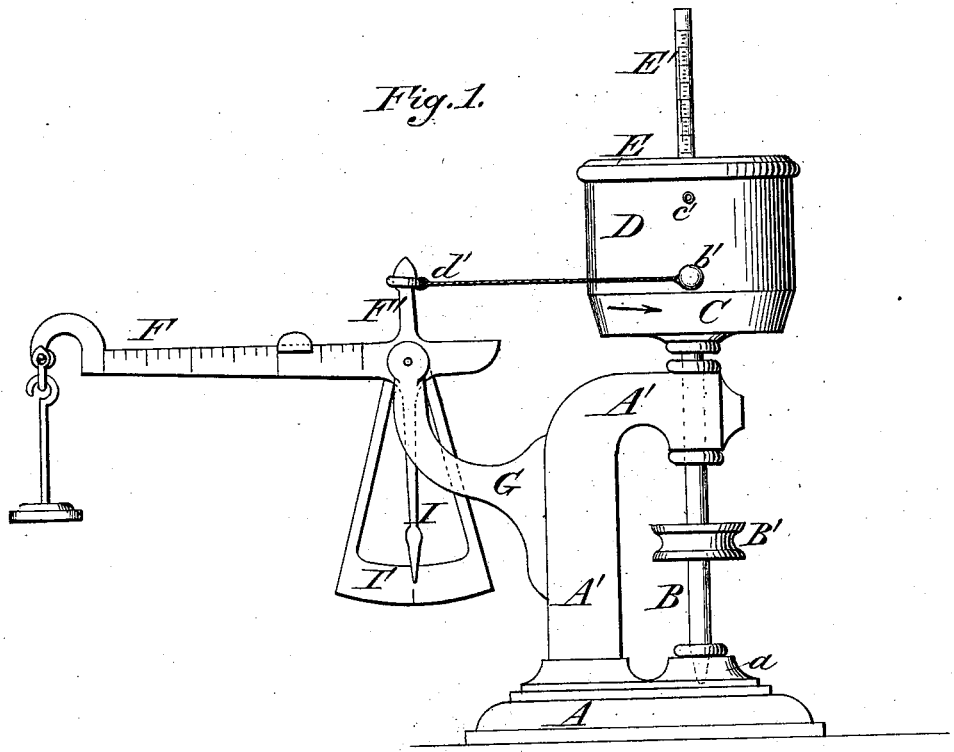
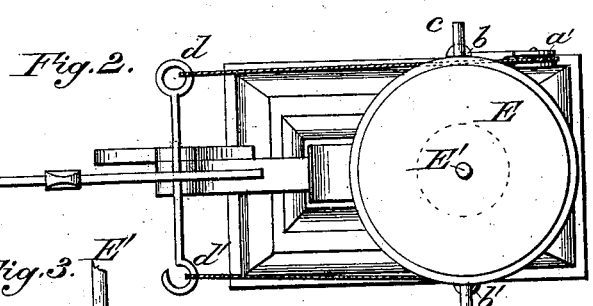
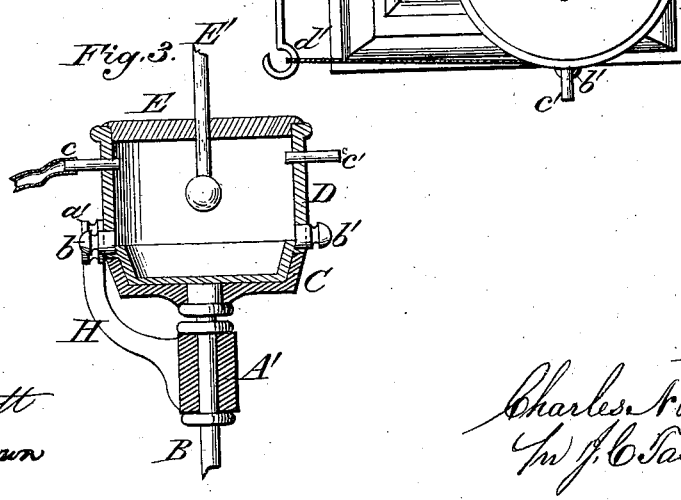

UNITED STATES PATENT OFFICE.

CHARLES N. WAITE, OF MANCHESTER, NEW HAMPSHIRE.

APPARATUS FOR TESTING LUBRICATING-OILS.

SPECIFICATION forming part of Letters Patent No. 226,639, dated April 20, 1880.

Application filed October 21, 1879.

*To all whom it may concern:*

Be it known that I, CHARLES N. WAITE, of Manchester, in the county of Hillsborough and State of New Hampshire, have invented certain new and useful Improvements in Apparatus for Testing Lubricating-Oils; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in that class of apparatus used for testing lubricating-oils, the object being to simplify the construction and obviate certain defects which are found in the instruments heretofore constructed for that purpose.

To accomplish these results I employ a cup-shaped metallic vessel filled with a constantly-changing fluid, by which means the bearing or frictional surfaces are retained at an equable temperature during the operation of testing a lubricant, and the weight upon the bearing-surfaces may be regulated by the quantity of water or other fluid in the cup, the frictional or bearing surfaces being obtained by placing the cup in a correspondingly-shaped receptacle attached to the upper end of a revolving shaft, the oil to be tested being placed between the bearing-surfaces of the cup and of the revolving receptacle, and the amount of friction produced by the revolution of the latter upon the cup being measured by means of a scale-beam and weights suitably attached to the cup, all as will be hereinafter fully described.

In the drawings, Figure 1 is a side elevation of the machine, showing the relative arrangement of the parts to each other. Fig. 2 is a plan of the whole apparatus; and Fig. 3 represents a vertical section through the cup, rotating oil-receptacle, and standard which supports the upper end of the shaft carrying the oil-receptacle.

The base A and standard A', which rises therefrom, are preferably cast in one piece, of metal, and may be of any desired form, so long as they subserve the purpose of carrying the superimposed mechanism steadily, as, were they so light as to allow much vibration, it would seriously impair the accuracy of the test. Through a journal-box in the projecting arm of the standard A' passes vertically the shaft B, its lower end resting in the step $a$, formed in the base. A pulley, B', is placed upon the shaft, through which it is rotated by a belt from any suitable motor. If desired, a counter may also be connected to register the number of revolutions of the shaft in a given time, as the speed with which the frictional surfaces move upon each other forms an important factor in determining the value of a lubricant.

To the top of the shaft B, and revolving with it, is secured the shallow pan-shaped oil-receptacle C, its sides inclining outwardly at an angle with its bottom, and forming the frictional bearing-surface for the conical lower part of the cup D. This cup is provided upon its opposite sides with two projecting studs, $b$ and $b'$, by which it is connected to the scale-beam and prevented from turning with the shaft B. It is also provided with an inlet-pipe, $c$, and outlet-pipe $c'$, through flexible connections, by which means a circulation of water or other fluid may be kept up, so as to keep the bottom of the cup at a constant temperature during the time of testing an oil, as a slight change in temperature makes a great difference in the fluidity of most oils, and in order to determine this temperature at all times the cover E of the cup is furnished with a thermometer, E', the bulb of which is immersed in the fluid within the cup, while its graduated stem projects above the cover.

A scale-beam, F, rests upon suitable bearings on the bracket G, which projects from the side of the standard A'. An upward projection, F', directly over the points of support of the scale-beam, carries two projecting arms, $d$ and $d'$, to eyes in the ends of which is secured the cord $e$, forming the connection between the scale-beam and the cup D. That portion of the cord $e$ which connects the stud $b$ with the arm $d$ passes over the pulley $a'$, pivoted in the bracket H, which projects upward from the horizontal arm of the standard A', while that portion of the cord which connects the eye of the arm $d'$ with the stud $b'$ is straight. The object of passing the cord $e$ over the pulley $a'$ upon one side of the cup is to change the direction in which a pull upon it by the stud $b$ would act upon the arm $d$.

It is evident that when the receptacle C is rotating in the direction of the arrow shown in Fig. 1 it will have a tendency to carry the cup D with it. This will be registered by a direct pull upon the cord connecting the stud $b'$ with the arm $d'$. Now, if the cord on the opposite side went direct from the stud $b$ to the arm $d$, it would be slackened by the same movement of the cup; but by passing it around the pulley $a'$ it is made to pull upon the arm $d$ in the same direction as the cord does, which passes directly from $d'$ to $b'$, thus equalizing the strain upon both arms.

The scale-beam is further provided with a depending pointer, I, which marks any deflection of the beam from the horizontal upon the arc I', permanently attached to the bracket G.

The operation of the instrument is as follows: The lubricant to be tested is put into the receptacle C in sufficient quantity to come up the inclined sides thereof, when the cup D is inserted, forming a film between the correspondingly-inclined sides of both receptacle and cup. It will be understood that the bottom of the cup does not quite reach the bottom of the receptacle, so that there is no support for the cup except upon its inclined portion, which forms the frictional surface in contact with the sides of receptacle C. The cup being now filled with water or other fluid, a rotating movement is communicated to the shaft B, and by it imparted to the receptacle C, the friction of which upon the cup D will cause the latter to have a tendency to revolve with the shaft, which will be resisted by the cords attached to the scale-beam and counteracted by the weights applied to the latter—the more perfect the lubricant the less the weight required to counterpoise the friction between the cup and oil-receptacle.

Having thus described my invention, I claim as new, and desire to secure by Letters Patent, the following:

1. In an oil-testing machine, the bearing-cup D, provided with means for maintaining a circulation of water or other fluid through it, for the purpose of maintaining an equal temperature of its frictional bearing-surface, as set forth.

2. The cup D, provided with studs $b$ and $b'$, in combination with the cord $e$, pulley $a'$, arms $d\ d'$, and scale-beam F, all arranged and operating substantially as described.

3. The cup D, provided with inlet and outlet pipes $c\ c'$, in combination with the oil-receptacle C and rotating shaft B, substantially as and for the purpose specified.

4. The standard A', provided with the brackets G and H, in combination with shaft B, oil-receptacle C, cup D, and scale-beam F, all connected and arranged for joint operation in the manner substantially as shown and described.

In testimony that I claim the foregoing I have hereunto set my hand this 9th day of October, 1879.

CHAS. N. WAITE.

Witnesses:
JAMES B. STRAW,
JOHN H. ANDREWS.